(12) United States Patent
Azoulay et al.

(10) Patent No.: US 11,012,613 B2
(45) Date of Patent: May 18, 2021

(54) FLAT SURFACE DETECTION IN PHOTOGRAPHS

(71) Applicant: SERELAY LIMITED, London (GB)

(72) Inventors: Roy Azoulay, Oxford (GB); Ian Field, London (GB); Clinton Montague, Reading (GB)

(73) Assignee: SERELAY LTD., London (GB)

( * ) Notice: Subject to any disclaimer, the term of this patent is extended or adjusted under 35 U.S.C. 154(b) by 23 days.

(21) Appl. No.: 16/560,630

(22) Filed: Sep. 4, 2019

(65) Prior Publication Data
US 2021/0067683 A1    Mar. 4, 2021

(51) Int. Cl.
| | | |
|---|---|---|
| *H04N 5/232* | (2006.01) | |
| *G06N 20/00* | (2019.01) | |
| *G03B 13/36* | (2021.01) | |
| *G06K 9/62* | (2006.01) | |

(52) U.S. Cl.
CPC ......... *H04N 5/23218* (2018.08); *G03B 13/36* (2013.01); *G06K 9/6269* (2013.01); *G06N 20/00* (2019.01); *H04N 5/232121* (2018.08)

(58) Field of Classification Search
CPC ......... H04N 5/23218; H04N 5/232121; G06K 9/6269; G06N 20/00; G03B 13/36
See application file for complete search history.

(56) References Cited

U.S. PATENT DOCUMENTS

| | | | | |
|---|---|---|---|---|
| 10,692,202 | B2* | 6/2020 | Azoulay | G06T 3/0068 |
| 2008/0219655 | A1* | 9/2008 | Yoon | H04N 5/23212 |
| | | | | 396/127 |
| 2010/0171764 | A1* | 7/2010 | Feng | G06F 3/0481 |
| | | | | 345/660 |
| 2012/0050561 | A1* | 3/2012 | Kitajima | H04N 1/2179 |
| | | | | 348/222.1 |
| 2014/0368695 | A1* | 12/2014 | Sako | H04N 5/23218 |
| | | | | 348/231.99 |
| 2015/0242982 | A1* | 8/2015 | Choi | H04N 5/232122 |
| | | | | 382/106 |
| 2018/0063411 | A1* | 3/2018 | Rivard | H04N 5/23222 |
| 2019/0096067 | A1* | 3/2019 | Jin | G06T 7/149 |

* cited by examiner

*Primary Examiner* — Abdelaaziz Tissire
(74) *Attorney, Agent, or Firm* — Fresh IP PLC; Clifford D. Hyra; Aubrey Y Chen

(57) ABSTRACT

A system and method is disclosed for detecting whether a photograph is of a flat surface, e.g. a "photograph of a photograph", or of a real three dimensional scene. The method includes using a digital camera to take a photograph, and within a predetermined time period either before or after taking the photograph, recording focal length information from a plurality of focus areas using the autofocus routine of the digital camera. The recorded focal length information forms the input to a machine learning classifier which has been trained to classify scenes as "flat" or "3D".

26 Claims, 2 Drawing Sheets

FLAT SURFACE DETECTION IN PHOTOGRAPHS

The present invention relates to improvements in the detection of photographs which are not genuinely reflective of a real scene but have been tampered with.

BACKGROUND TO THE INVENTION

In various situations it is important to verify the authenticity of a photograph—in other words, to verify that a photograph is of a genuine scene which was in front of the lens of a camera at the time the photograph was taken. Examples of these situations include photographs submitted to support insurance claims, and photographs submitted by members of the public to news organisations. Photo editing and re-touching software is now readily available and even cheap consumer-grade editing software can produce edited photographs where the changes are difficult to detect visually.

The applicant's co-pending application no. PCT/IB2018/050036, which is incorporated herein by reference, describes a system whereby, by providing trusted software at the point of capture and using cryptographic transformations, the authenticity of a photograph can be to some extent guaranteed, in that with a high level of confidence the system can say that a particular photograph is of the unaltered scene which was in front of a camera at a particular place at a particular time.

However, one way of attempting to circumvent such a system would be to retouch or edit a photograph, to create an artificial or false scene, then to print out the altered photograph, and then to use the "trusted" system of PCT/IB2018/050036 to take a photograph of the printed photograph at any particular time and place. Alternatively the altered photograph could be displayed on a screen and the screen could be photographed. In the right lighting conditions and with a suitable quality of print or display screen, the result may look visually very real. The assurances given by the trusted system would however not be valid, since the photograph may have been altered, staged in a different location at a different time, or completely falsified.

The applicant's co-pending application Ser. No. 16/134,952 verifies photographs to detect whether they are photographs of a real three-dimensional scene or whether they are "photographs of photographs". It does this by taking two photographs of the same scene at different exposures. In one embodiment, one photograph is taken with the flash turned on and one photograph is taken with the flash turned off. This approach somewhat affects the user experience, requiring two photographs to be taken instead of one, and activating the flash. Furthermore, in most practical embodiments, both photographs need to be sent away to a server for processing and verification. This may be a problem in areas where data connectivity is expensive, slow, or unreliable.

It is an object of the present invention to provide an improved method of capturing a photograph of a scene and verifying the photograph, which solves these problems.

SUMMARY OF THE INVENTION

According to the present invention, there is provided a method of capturing a photograph of
a scene and verifying the photograph, the method comprising the steps of:
carrying out the following steps in any order but within a predetermined time period:
using a digital camera to take a photograph of a scene; and
causing an autofocus routine of the digital camera to focus in turn on a plurality of focus areas, and recording a focal length for each focus area;
inputting the recorded focal length values to a machine learning classifier which has been trained to classify scenes as "flat" or "not flat"; and
outputting an indication as to whether the photograph was of a flat surface.

The method provides, in a fast and non-disruptive way, an indication as to whether the photograph is of a real 3D scene. The method may be implemented in software adapted to run on existing consumer devices, particularly smartphones. Almost all such devices already have a built-in autofocus routine which can be used in this way, to provide valuable confidence as to the authenticity of a photograph.

The classifier may output a numerical confidence score as to whether the photograph is of a flat surface. If the indication, above some threshold confidence score, is that the photograph is not of a flat surface, i.e. it is of a real 3D scene, then the photograph may be treated as "verified" or "trusted" for the purposes of the test of this invention. The verification that the photograph is not of a flat surface may form part of a whole series of tests which can be carried out to detect various potential alterations or features which may make the photograph untrustworthy. In addition, in some embodiments the test of the invention may be one of a series of different tests all designed to answer the same question—whether the photograph is of a flat surface or not. In such embodiments, the confidence of the overall result may be improved by combining results from a number of different methods, for example combining the method of this invention with the method of xxxxxx.

In many embodiments, the recorded focal length values may be sent to a different machine, for example a server, separate from the device on which the photograph is taken and the focal length values are collected. The classifier may be run on this separate server machine, which will typically have greater processing and memory resources than a smartphone. Only the focal length values need to be sent to the classifier. This is a very small amount of data and therefore can be sent quickly even with very poor network connectivity.

On the other hand, increasingly, it is possible for machine learning classifiers to be run on a device such as a smartphone. This is expected to become more common as the performance of hardware increases, and embodiments where the classification is entirely done on the same device which captures the data are envisaged.

The photograph may be taken first, and then the focal length information can be collected. Alternatively, the focal length information may be collected before the photograph is taken. What is important is that both steps are carried out within a short period of time, for example within one second, so that with high confidence it can be said that the camera is pointing at the same scene during both critical steps.

The indication as to whether the photograph was of a flat surface may be stored in a trusted database, alongside the photograph or an identifier for the photograph (which may be for example a hash of the photograph). Alternatively, the raw focal length data may be stored alongside the photograph of identifier for the photograph. In other words, the machine learning classifier does not necessarily need to be run soon after the photograph is taken. Alternatively, the data may just be stored so that the classifier may be run if a query as to that photograph arises. On the one hand running the classifier for every photograph and storing the result will speed up query times, on the other hand just saving the raw data will use less processing resource—very significantly less in some applications—because for many photos although it is important to be able to verify them if needed, the query may never in practice arise.

In some embodiments, measurements are recorded from an accelerometer in the same device as the digital camera while the critical capture steps are carried out. Accelerometer data may be used to validate the measurements. Where the accelerometer data indicates that the device moves significantly between the photograph being taken and the focal length data being collected, or during the capture of focal length information from the different focal areas, the result may be marked as invalid. In some embodiments, accelerometer data may form an input to the machine learning classifier, and the classifier may be adapted to have possible outputs of "flat", "3D", or "invalid", the invalid output relating to the case where the accelerometer data indicates that the camera has moved too much, and/or other factors which may make a "flat" or "3D" determination unreliable. In other embodiments, a determination as to the validity of the focal length measurements may be made separately from the machine learning classifier.

In some embodiments, the step of collecting focal length data may be carried out once before the photograph is taken, and again after the photograph is taken. This may further serve to provide confidence that the focal length data collected is a true reflection of where the camera was pointing when the photograph was taken.

Where two sets of focal length data are captured, they may be compared. If they are too different (i.e. the difference is beyond a predetermined threshold) then the capture may be marked as invalid. Alternatively, the two sets of focal length data may both form inputs to the machine learning classifier, and in these embodiments it may be the classifier which makes the determination as to whether or not the result is valid or not.

In some embodiments, the focus areas are fixed within the camera's field of view. For example, in a particular embodiment there are five focus areas, which are in the top left, top right, bottom left, bottom right, and at the centre point of the camera's field of view. Wherever the particular focus areas are, in the method the autofocus routine of the camera is automatically instructed to focus on each region in turn, and report a focal length value. The auto-focus commands are preferably executed in a particular order, with one auto-focus operation needing to complete in full and report a focal length before the next command is executed to focus on the next focus region.

The focus areas may be in fixed positions, for example in the top left, top right, bottom left, bottom right, and centre as described above. However, some embodiments may choose the position of the focus areas within the camera's field of view dynamically—that is, different focus areas may be chosen each time a photograph is taken. In some embodiments, known object recognition algorithms could be used to determine the position of objects in the camera's field of view, and the different focus areas could be chosen accordingly in order to focus on different objects. In some embodiments, there could be a random aspect in choosing the position of the focus areas. In some embodiments, the focus areas while dynamically chosen may be subject to constraints, for example there must be minimum distances between the focus areas, or the focus areas must between them be within a minimum number of predetermined "slices" of the camera's field of view. Some embodiments may use more than one of the above techniques in any combination.

In addition to the focal length information recorded before and/or after the photograph is taken, the camera's reported focal length when the photograph was taken may be taken into account as well.

A machine learning classifier approach has been found to give better results when compared to hand-designed algorithms. Machine learning classifiers can be taught to approximate highly non-linear and complex functions, which makes them very suitable in this application. In terms of measured focal length, small changes closer to the device give a large reading difference, whereas large changes further away give a small reading difference. It has been found that machine learning classifiers are nonetheless able to classify with reasonable accuracy in real-world conditions.

In particular, a Support Vector Machine trained model is found to consistently provide most accurate classification in this application. It is thought that the feature space occupied by "flat" readings is small and well-defined, and can easily be separated from "3d"/"real" readings by a linear vector, or a low-order polynomial vector.

Accuracies of 85-90% have been achieved in testing, using common consumer smartphone hardware.

Depending on the scene and the available data, it may be possible to make a confident determination based on less than the maximum number of focal length records. However, more "difficult" or borderline cases may require the full amount of data to be collected. In some embodiments a local classifier may be provided on the same device as the camera, and a remote classifier may be provided on a remote server. The local classifier is likely to have access to significantly reduced memory and processor resources compared with the remote classifier, and so may need to have much reduced complexity. However, the local classifier may act as a coarse filter, and where the focal data provided indicates with very high confidence on the local classifier that the scene is not flat, the need to send data to the remote classifier is avoided. In particular, the local classifier may be sent incomplete sets of focal length data (e.g. the local classifier may be run on just the first two focal length measurements while the third measurement is still being made), and if the incomplete data shows with high confidence that the scene is not flat, collection of data may be stopped early. This ensures that the verification process takes no longer than is absolutely required, and yet ensures that the full power of complex classifiers, with maximum input data, is available when required for the less clear-cut cases.

Depending on the camera used, which is likely to be existing consumer hardware like a smartphone, the focal length measurements may be calibrated or uncalibrated. Android (RTM) smartphones generally provide focal length data in diopters (1/meters) whereas iOS smartphones output a scale between 0.0 and 1.0. In addition, in most embodiments a boolean value may be generated locally signifying whether the accelerometer readings suggest that significant movement has taken place.

The classifier is preferably trained using a supervised learning approach, i.e. a set of training examples is created, using some pictures which are flat and some pictures which are of a real 3D scene. During training the classifier is told whether it has made the correct determination or not. Over a period of training with a large number of examples, the classifier will start to more reliably classify photographs as either "flat" or "3D".

Separate models may be created for different makes, models, or types of digital camera (in practice, different makes, models, or types of smartphone). This reflects differences in the hardware and software which may affect how focal length data is reported. As described above, it has been consistently found that a Support Vector Machine provides very good performance in this application, but other types of models may be used in some embodiments, for example, naïve Bayes models, neural network models, k-nearest neighbours, support vector machines, and logistic regression models. The best performing model on each platform (type of smartphone) may be selected for use.

DESCRIPTION OF THE DRAWINGS

For a better understanding of the invention, and to show more clearly how it may be carried into effect, a specific embodiment will now be described, by way of example only, in which.

DESCRIPTION OF THE PREFERRED EMBODIMENT

Figure 1:
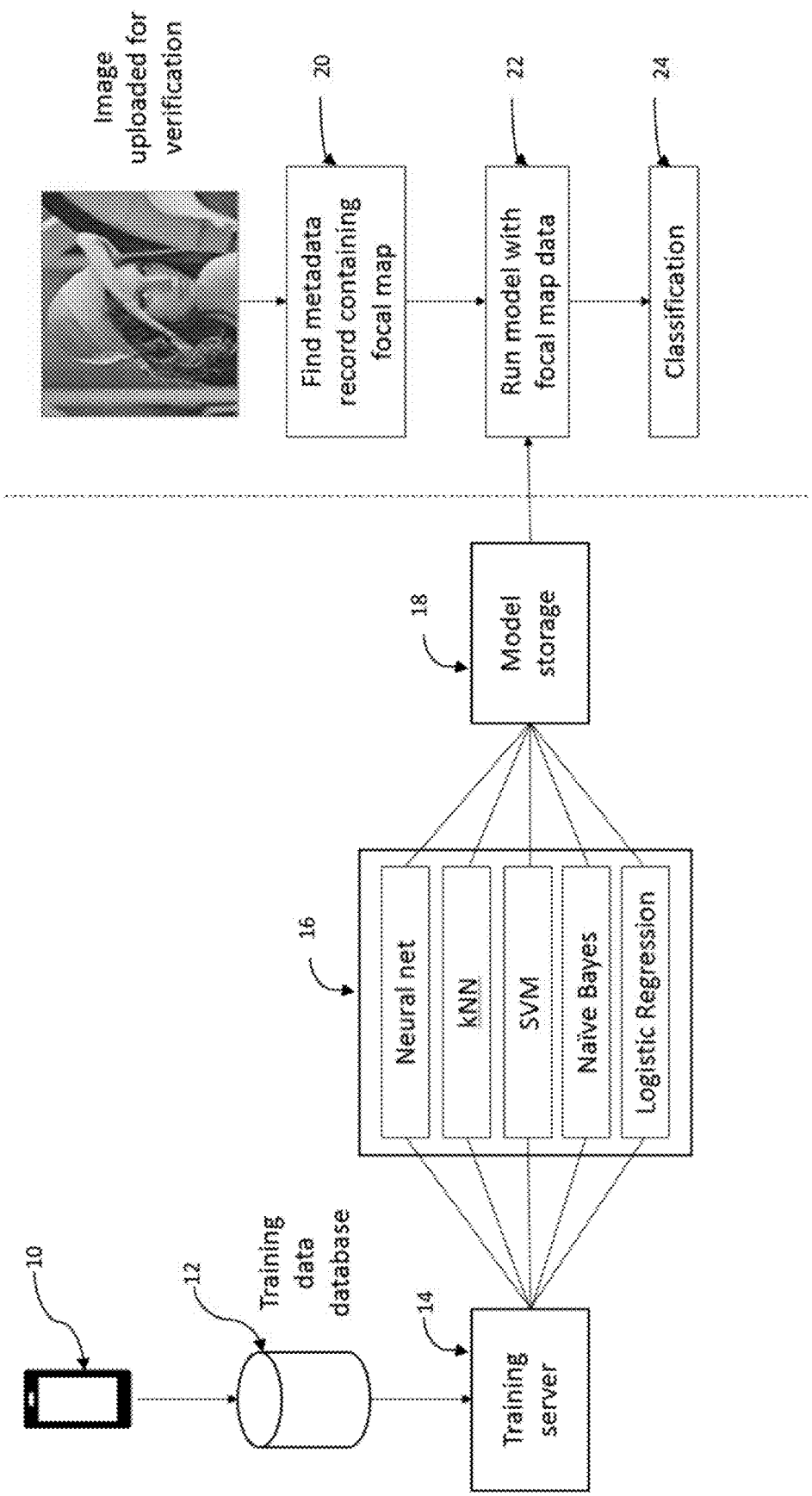
FIG. 1 is a diagram showing how classification models are trained and deployed to distinguish "flat" and "3D" scenes.

Referring firstly to FIG. 1, a process for training models and using one of the models to verify a photograph is shown. The left-hand-side of the figure, to the left of the vertical broken line, shows the model training process, and the right-hand-side of the figure, to the right of the vertical broken line, shows the process of verifying a photograph using a trained model.

To train the model, a training app on a mobile smartphone 10 is used. The training app is designed to collect focal length information from a plurality of focus areas in the field of view of the smartphone's camera, and to accept manual user input as to whether the image is flat or 3D. Optionally, the training app may capture a photograph. The training app collects data in multiple focus areas, for example in the four corners and at the centre of the camera's view. This focal data is stored along with the user input indicating whether there is a flat image or a real 3D scene in the camera's field of view. Preferably, training includes different examples which are visually similar, but one of which is flat and one of which is 3D. In other words, the training may include a real 3D scene, and a flat photograph of the real 3D scene.

In some embodiments, the training app may also capture and store accelerometer data along with the focal information. Some embodiments may measure the focal length at each focus area twice, and store accelerometer data measured between the two focal length measurements. In these embodiments the training data may include cases where the camera has moved between two scenes between the two focal length measurements, in which case the classifier should be trained to indicate an "invalid" output.

The training data generated in the training app comprises a plurality of records, each record including at least a recorded focal length for each of the plurality of focus areas, and the indication as to whether the image in the field of view of the camera was flat or 3D. The training records are stored in a training data database 12 which is on, or at least accessible to, a training server 14. The training server 14 trains multiple machine learning classifiers 16 using supervised learning. As examples of the types of classifiers which may be trained, they may include neural network models, k-nearest-neighbours algorithms, support-vector machines, naïve Bayes classifiers, and logistic regression models. Preferably, the training server may train multiple classifiers. This may include multiple different types of classifiers, and/or multiple different classifiers of the same type but with different structures. For example, neural networks with different numbers of hidden layers and different numbers of nodes in each layer may be trained.

It has been found that trained Support Vector Machines are particularly advantageous in this application, and multiple Support Vector Machines with different parameters may be trained in order to maximise the possibility of training an optimal model.

When multiple models have been trained, each model may be tested using validation data. Validation data is further data which has been gathered by the mobile device 10, and has been manually marked with an indication as to whether the camera's field of view contained a flat or a 3D scene. However, the validation data is a subset of such records which are not used for training. Testing each model against validation data involves applying the focal length measurements in each validation record to the model, and comparing the classification from the model to the manual indication. The proportion of validation examples for which the classification model gives the correct answer is then used as a measure of the quality of each model. Where multiple models are trained, the model scoring best in the validation stage may be deployed for "live" use.

Different models may be trained for different types of mobile device. For example different models may be trained for iOS devices and Android devices. To train a single model, training data may be generated using multiple different models and variants of smartphones which fit into the category, for example different makes and models of Android device may be used to generate training data to train a single model which is to be deployed on all Android devices. In some embodiments, information about the type of hardware may be included as part of the training data, to be taken as an input to the classifier. Particularly, information about the type of camera hardware may be included.

In some embodiments, the categories of mobile device for which different models are trained may be more finely defined, even to the extent that a model will be trained purely for use with a single make and model of mobile smartphone, or for use with smartphones incorporating specific camera hardware.

Models which have been validated as the best model for at least one type of device are stored in model storage 18.

On the right-hand-side of the broken line in FIG. 1, the process of verifying a photograph is illustrated. In most embodiments the verification process will take place not on the portable device on which the photograph was taken, but primarily on a remote server. However, some limited local verification may take place on the portable device in some embodiments.

In FIG. 1, the process is shown starting with a photograph which has been uploaded with a metadata record including a focal map. A focal map is a recorded focal length from each of a plurality of focus areas. Uploading the image itself is an optional step, since the image is not required to make the classification decision. However, in many embodiments the image may be uploaded for other reasons.

In step 20 the focal map is retrieved. This forms the input to a classification model. The classification model is retrieved from model storage 18. In many embodiments, the same server will process data sent from a variety of different models of portable device, and therefore the appropriate model will be chosen accordingly.

In step 22 the appropriate model is applied to the focal map. This results in a classification 24, either that the image is "flat" or "3D". It is this classification which is the object of the invention and which is useful as a factor in verifying the authenticity of a photograph.

Figure 2:
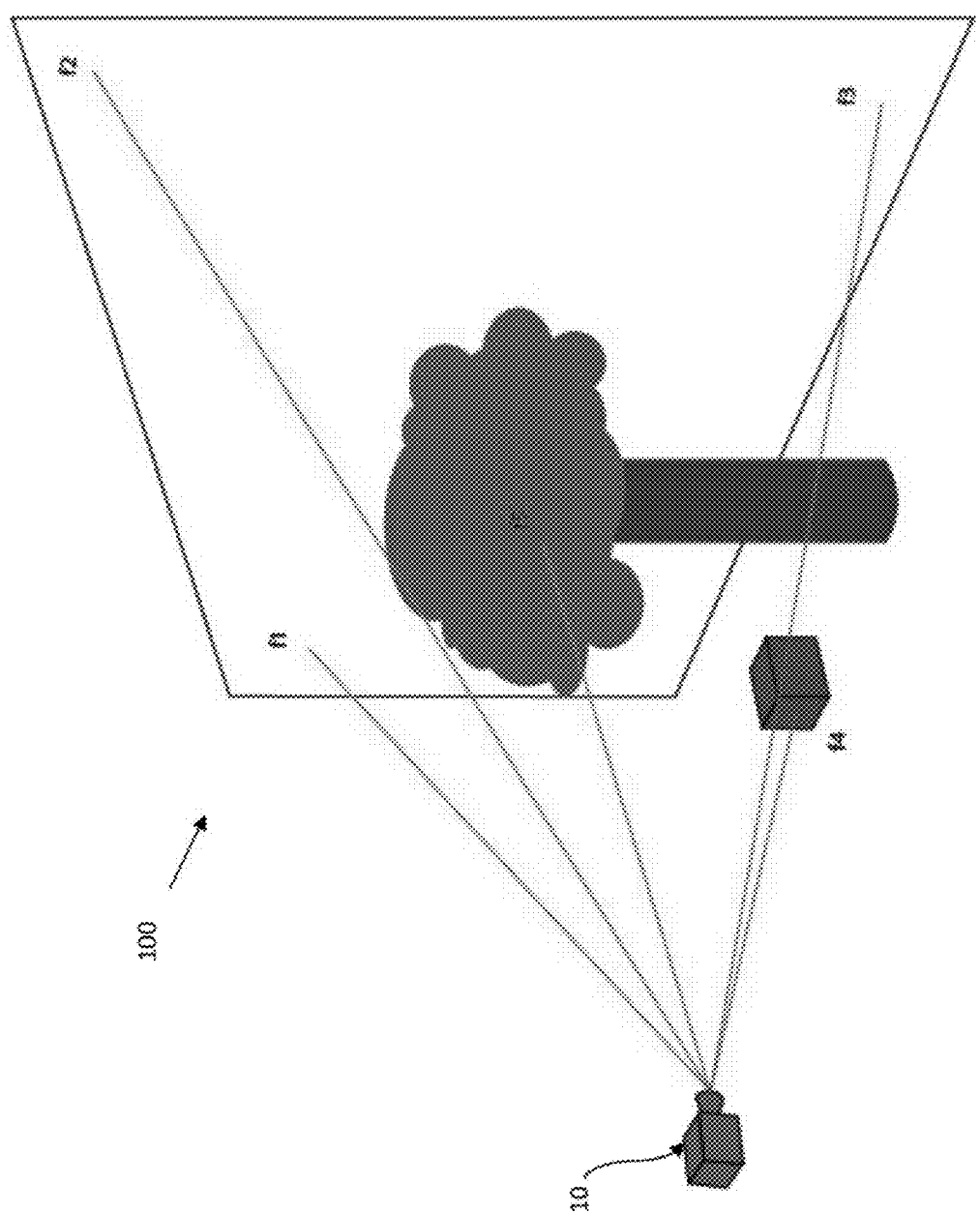
FIG. 2 shows a photograph of a scene being captured in accordance with the invention.

FIG. 2 shows an example of a scene 100 being photographed. In this example, the scene is a real three-dimensional scene. A camera 10, which is preferably part of a smartphone or similar device, is used to take a photograph of the scene. At substantially the same time, i.e. within a short predetermined time period, focal length information is retrieved from multiple focus areas in the camera's field of view. In this case, there are five focal areas labelled f1, in the top left of the image, f2, in the top right of the image, f3 in the bottom right of the image, f4 in the bottom left of the image, and f5 in the centre of the image. This focal length information forms the input to the classification model, to determine whether the photograph is of a scene which is flat, and thus potentially falsified, or 3D, and thus likely to be genuine at least in some sense.

The invention may be used to generate useful information which can be used as a factor in a determination as to whether or not a photographic image can be relied upon as a genuine record of a real 3D-scene at a particular place and time. The invention may be used in conjunction with for example the method disclosed in PCT/IB2018/050036, to provide assurance as to the authenticity of an image. It may also be used in conjunction with other indicators as to whether the scene is flat or 3D, for example as disclosed in XXXXX.

The invention claimed is:

1. A method of capturing a photograph of a scene and verifying the photograph, the method comprising the steps of:
   carrying out the following steps in any order but within a predetermined time period:
   using a digital camera to take a photograph of a scene;
   causing an autofocus routine of the digital camera to focus in turn on a plurality of focus areas; and
   measuring and recording one or more focal lengths for each focus area;
   inputting the recorded focal length values to a machine learning classifier which has been trained to classify scenes as "flat" or "not flat"; and
   outputting an indication as to whether the photograph was of a flat surface, based on the output of the machine learning classifier,
   wherein the machine learning classifier has been trained utilizing a supervised learning approach comprising a set of training examples, wherein the set of training examples comprises photographs of "flat" scenes and photographs of "not flat" scenes.

2. The method of capturing a photograph as claimed in claim 1, in which the digital camera forms part of a device which further includes a processor.

3. The method of capturing a photograph as claimed in claim 2, in which the device is a smartphone.

4. The method of capturing a photograph as claimed in claim 2, in which at least the steps of taking a photograph of a scene and causing an autofocus routine of the digital camera to focus in turn on a plurality of focus areas, and recording a focal length for each focus area, are caused to take place automatically by software running on a processor associated with the digital camera.

5. The method of capturing a photograph as claimed in claim 1, in which the machine learning classifier is a Support Vector Machine.

6. The method of capturing a photograph as claimed in claim 1, in which the focus areas are dynamically chosen within the field of view of the camera.

7. The method of capturing a photograph as claimed in claim 6, in which the focus areas are dynamically chosen based on the output of an object recognition algorithm.

8. The method of capturing a photograph as claimed in claim 1, in which the machine learning classifier is a remote machine learning classifier running on a different machine from the digital camera, and in which the digital camera is part of a device which further includes communication means, and in which the recorded focal length data is sent by the communication means from the digital camera to the remote machine learning classifier.

9. The method of capturing a photograph as claimed in claim 8, in which a local machine learning classifier is provided running on the same machine as the digital camera, and in which the recorded focal length data is sent by the communication means from the digital camera to the remote machine learning classifier conditional on a result of the local machine learning classifier.

10. The method of capturing a photograph as claimed in claim 9, in which the local machine learning classifier is applied to input data forming a subset of the recorded focal lengths at the plurality of focus areas.

11. The method of capturing a photograph as claimed in claim 1, in which focal length information is recorded before the photograph is taken.

12. The method of capturing a photograph as claimed in claim 1, in which focal length information is recorded after the photograph is taken.

13. The method of capturing a photograph as claimed in claim 1, in which the predetermined time period is less than 1 minute.

14. The method of capturing a photograph as claimed in claim 1, in which the digital camera is part of a device which further includes an accelerometer, and readings from the accelerometer are collected and recorded substantially for the duration of the steps of capturing the photograph and causing the autofocus routine to focus on a plurality of focus areas.

15. The method of capturing a photograph as claimed in claim 14, in which the readings from the accelerometer are used to make a determination as to validity of the focal length readings, separately from the machine learning classifier.

16. The method of capturing a photograph as claimed in claim 14 in which the readings from the accelerometer form a further input to the machine learning classifier.

17. The method of capturing a photograph as claimed in claim 1, in which the focal length according to the autofocus routine of the digital camera when the photograph was taken is recorded and forms a further input to the machine learning classifier.

18. The method of capturing a photograph as claimed in claim 1, wherein the machine learning classifier has been further trained to classify scenes as "invalid" in situations where either a "flat" or "not flat" determination is unreliable.

19. The method of capturing a photograph as claimed in claim 1, further comprising:
   comparing the focal length values for each focus area with each other to determine a difference; and
   comparing the difference with a predetermined threshold;

classifying the scene as "invalid" when the difference exceeds the predetermined threshold.

20. The method of capturing a photograph as claimed in claim 1, wherein the focus areas are fixed within the field of view of the camera, and wherein the focus areas are selected from the group consisting of: top left of the field of view, top right of the field of view, bottom left of the field of view, bottom right of the field of view, centre of the field of view, and combinations thereof.

21. The method of capturing a photograph as claimed in claim 1, wherein the autofocusing routine focuses on the plurality of focus areas in a predetermined order, and wherein the one or more focal lengths are determined for a given focus area before proceeding to a next focus area.

22. The method of capturing a photograph as claimed in claim 1, wherein the machine classifier is a remote machine learning classifier running on a different machine from the digital camera, wherein the different machine retrieves the remote machine learning classifier from a plurality of stored classification models, and wherein the different machine retrieves the recorded one or more focal lengths for each focus area from storage.

23. The method of capturing a photograph as claimed in claim 1, wherein two focal lengths are measured and recorded for each focus area, and wherein accelerometer data is measured between the measuring of the two focal lengths.

24. The method of capturing a photograph as claimed in claim 1, wherein the predetermined time period is less than 1 second.

25. A system for capturing a photograph, the system comprising:
a portable device, the portable device including a digital camera and a processor, and software which when executed on the processor is adapted to cause the device to carry out the following steps automatically and in any order but within a predetermined time period:
using the digital camera to take a photograph of a scene; and
causing an autofocus routine of the digital camera to focus in turn on a plurality of focus areas, and recording a focal length for each focus area;
and a machine learning classifier which accepts inputs of the focal length values recorded by the portable device, and which has been trained to classify scenes as "flat" or "not flat",
wherein the machine learning classifier has been trained utilizing a supervised learning approach comprising a set of training examples, wherein the set of training examples comprises photographs of "flat" scenes and photographs of "not flat" scenes.

26. The system as claimed in claim 25, in which the portable device is a smartphone.

* * * * *